United States Patent
Cranford, Jr. et al.

(10) Patent No.: US 7,512,177 B2
(45) Date of Patent: Mar. 31, 2009

(54) METHOD AND APPARATUS FOR GENERATING RANDOM JITTER

(75) Inventors: Hayden C. Cranford, Jr., Cary, NC (US); Marcel A. Kossel, Zurich (CH); Vernon R. Norman, Cary, NC (US); Martin L. Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 11/828,390

(22) Filed: Jul. 26, 2007

(65) Prior Publication Data

US 2008/0150599 A1     Jun. 26, 2008

Related U.S. Application Data

(63) Continuation of application No. 10/720,974, filed on Nov. 24, 2003, now Pat. No. 7,295,604.

(51) Int. Cl.
 *H04B 3/46* (2006.01)
(52) U.S. Cl. .................. 375/226; 375/371; 327/582
(58) Field of Classification Search ............... 375/226, 375/306, 338, 371
 See application file for complete search history.

(56) References Cited

U.S. PATENT DOCUMENTS

| | | | |
|---|---|---|---|
| 3,492,512 A * | 1/1970 | Eckl | 327/582 |
| 5,452,333 A | 9/1995 | Guo et al. | |
| 6,404,257 B1 | 6/2002 | Livoisi | |
| 7,120,838 B2 | 10/2006 | Casper et al. | |
| 7,133,654 B2 | 11/2006 | Carballo | |
| 2002/0021776 A1 | 2/2002 | Shim et al. | |
| 2003/0189985 A1 | 10/2003 | Okuda et al. | |

\* cited by examiner

*Primary Examiner*—Emmanuel Bayard
(74) *Attorney, Agent, or Firm*—Joscelyn G. Cockburn; Patrick J. Daugherty; Driggs, Hogg, Daugherty & Del Zoppo Co., LPA

(57) ABSTRACT

Apparatuses and methods comprise a phase shifter, an adjustable capacitance configured to adjust a phase shift of said phase shifter, an arbitrary waveform generator configured to adjust the adjustable capacitance, and a pulse pattern generator coupled to the phase shifter, the phase shifter is configured to control the pulse pattern generator. In one aspect, an adjustable capacitance is at least one varactor diode. In another, a pair of varactor diodes are separated by λ/4 lines, an input and an output of the adjustable capacitance is AC-coupled, and the arbitrary waveform generator is configured to adjust the adjustable capacitance through a gaussian noise signal input to the pair of varactor diodes. A deterministic jitter generator may be coupled to the pulse pattern generator. An open-circuited stub line may be input to the pattern generator, a deterministic jitter content number adjustable varying stub line length.

17 Claims, 6 Drawing Sheets

METHOD AND APPARATUS FOR GENERATING RANDOM JITTER

RELATED APPLICATION

This application is a continuation of application Ser. No. 10/720,974, filed Nov. 24, 2003.

TECHNICAL FIELD

The present invention relates to a high speed serial link and to a method for determining jitter of a signal in the high speed serial link.

BACKGROUND OF THE INVENTION

A general definition of jitter means that jitter is a measure of the time deviation that the waveform exhibits at its significant instants from an ideal reference. In a digital signal, the significant instants are the transition points. The reference can be generated from the sampled data or is externally provided.

In the upper part of FIG. 1, the timing diagram of a data signal S is illustrated. Below the course of the data signal S an enlarged part of a part of the data signal is shown. As it can be seen, due to the jitter the points of time at which the state of the signal changes cannot exactly be defined and the bigger the jitter gets, the smaller the eye opening EO gets.

The sources of jitter can be grouped into three categories. The first category includes all random noise processes including the shot noise, thermal noise, and pink noise found in electronic components and subsystems such as oscillators and phase locked loops (PLL). The second group includes systematic effects such as crosstalk and spurious from adjacent lines and circuitry, and duty cycle distortion which is a measure of the symmetry of the high and low driving functions. The third category comprises all sources that exhibit data dependency including mechanisms such as intersymbol interference (ISI), dispersion, and word synchronized distortion.

Jitter is decomposed to two characteristic components which are termed "deterministic" and "random." The former is caused by systematic and data dependent sources, and the latter caused by noise mechanisms assumed to be Gaussian. Thus, the phase error function $\phi(t)$, is the sum of two composite functions:

$$\phi(t)=\phi(t)D+\phi(t)R.$$

wherein $\phi(t)D$, the deterministic component, is the addition of all functions of phase (or jitter) that will achieve their maximums and minimums in a defined time period—it follows that they are known as "bounded" sources, and $\phi(t)R$ is the sum of all Gaussian noise sources. Since Gaussian noise can be arbitrarily large it is considered "unbounded".

High-speed serial (HSS) link I/O ASIC cores frequently need to be compliant with standards, e.g. XAUI, FiberChannel, OIF SxI-5, or Infiniband, that specify the jitter by means of jitter numbers. These jitter numbers are termed DJ for deterministic jitter number, RJ for random jitter number and TJ for total jitter number and refer to a certain bit error rate (BER) boundary, e.g. BER=$10^{-12}$. Furthermore, test chips of the HSS cores need to be tested for compliance with jitter tolerance or jitter transfer masks. For this purpose, it is necessary to determine or capture the jitter.

The following methods are commonly applied for jitter measurements in serial links.

A first commonly used jitter characterization method is to analyze the eye diagram on an oscilloscope. How this can be done is described in Tektronix Datasheet, "RT-Eye Serial Data Compliance and Analysis Software, TDSRT-Eye", 2003 or Anritsu Datasheet, "MX176400A: Q and Eye Analysis Software", 2001. This method allows to measure the peak-to-peak jitter of the eye crossings by means of histogram functions. However, there is no direct relationship between the peak-to-peak jitter and a specific bit error rate BER. Furthermore, the method is not applicable for being used at runtime, this means during user data are transferred.

A second commonly used method for jitter characterization is the bit error rate test (BERT) scan method described in "Jitter and the new digital regime", Brian Fetz, Agilent Technologies or "Relationship between eye diagram and bathtub curves", Wavecrest Corporation, Technical Bulletin #13, 2003. A dedicated bit error rate tester is used to perform jitter bathtub curve measurements and to fit a jitter model for the extraction of the required jitter numbers. This method yields very accurate results but it is not applicable for a large number of links and cannot be used at runtime.

Finally, a third method for jitter characterization is known by which build in self test (BIST) functions are used. It is illustrated in the International Business Machines patent application EP 03405341.3 "Adjusting parameters of a serial link" filed on May 19, 2003. The built-in-self-test functions of a serializer/deserializer (SERDES) chip contain a pseudo random bit sequence generator and an error detector used for 'spot' BER measurements. As shown in this patent application, an extension of the BIST concept also allows to perform bit error rate test scan measurements. The advantage of this concept is that the desired jitter numbers for a specific BER boundary can be determined even for a large number of serial links. However, the disadvantage is that this measurement method fails at asynchronous operation and the SERDES cannot be operated with user data.

Therefore, none of the above mentioned methods is perfectly suited to meet the requirements specified for an asynchronous serial link and which is applicable for being used at runtime.

SUMMARY OF THE INVENTION

Therefore, one object of the invention is to provide apparatuses and methods, comprising a phase shifter, an adjustable capacitance coupled to and configured to adjust a phase shift of said phase shifter, an arbitrary waveform generator coupled to and configured to adjust said adjustable capacitance, and a pulse pattern generator coupled to said phase shifter, wherein said phase shifter is configured to control said pulse pattern generator.

In another aspect, an adjustable capacitance is at least one varactor diode. In one aspect, the at least one varactor diode is a pair of varactor diodes separated by λ/4 lines, an input and an output of the adjustable capacitance is AC-coupled, and the arbitrary waveform generator is configured to adjust the adjustable capacitance through a gaussian noise signal input to the pair of varactor diodes. In one aspect, a deterministic jitter generator is coupled to an output of the pulse pattern generator.

In another aspect, an open-circuited stub line is input to the pulse pattern generator. In one aspect, a deterministic jitter number of the jitter content is adjusted by varying a length of the open-circuited stub line.

Additional objects and advantages of the invention will be set forth in the description which follows, and in part will be obvious from the description, or may be learned by practice of the invention.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF THE INVENTION

Figure 1:
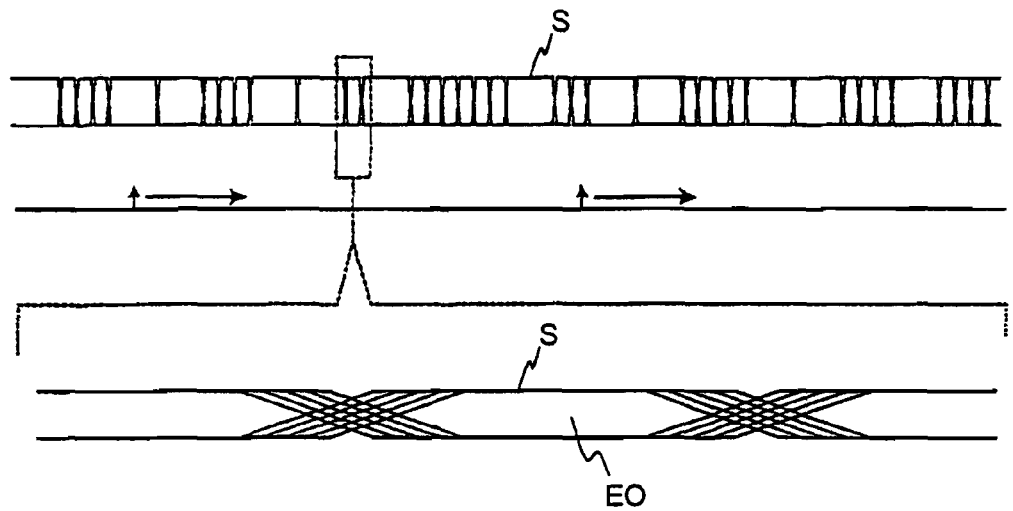
FIG. 1 a timing diagram of a data signal and an enlarged part thereof showing jitter, FIG. 2 a block diagram of a serial asynchronous link, FIG. 3 how to determine the jitter from a data signal, FIG. 4 an example of a jitter-versus-FM curve, FIG. 5 an eye diagram of a signal transmitted via a transmission line of a serial link, FIG. 6 an graphical illustration of a jitter model, FIG. 7 a bathtub curve, FIG. 8 a set of solutions in the deterministic jitter versus random jitter-plane, FIG. 9 analytically derived FM-TJ curves, FIG. 10 a block diagram of a random jitter generator, FIG. 11 a diagram of the phase adjustment and amplitude range which can be generated by the random jitter generator, and FIG. 12 a diagram of the performance of the random jitter generator.

FIG. 1 shows a timing diagram of a data signal and below an enlarged part thereof showing the jitter during the falling and raising signal edges. FIG. 1 and the illustrated jitter are already described in the section "Background of the invention".

Figure 2:
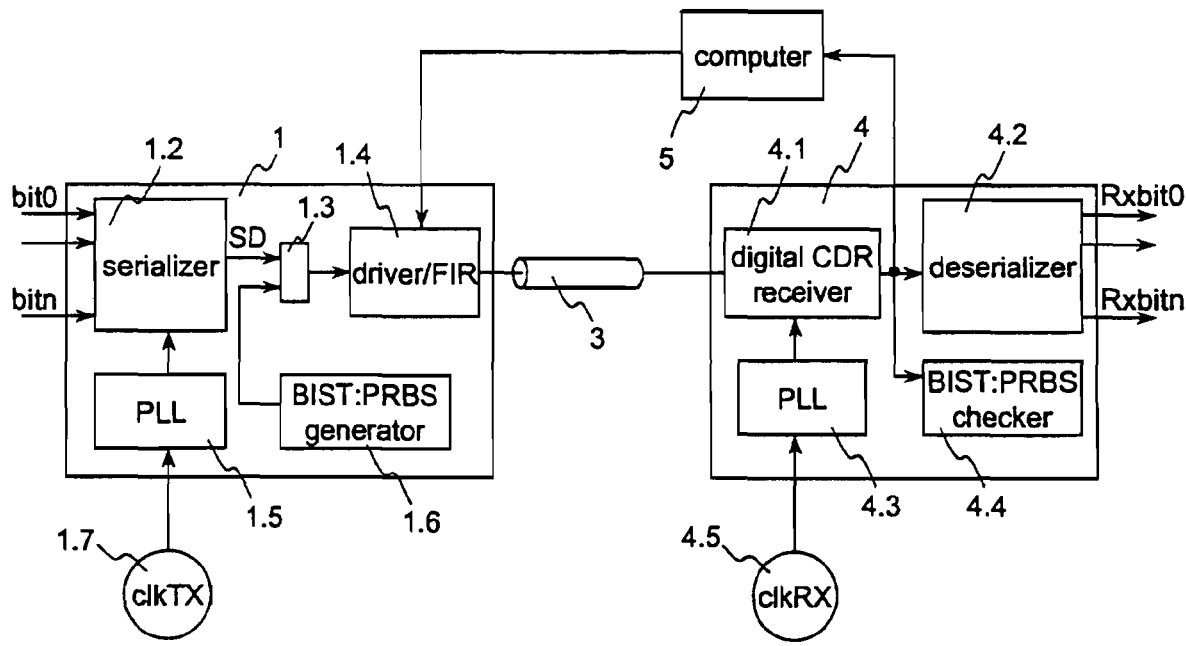

FIG. 2 shows a block diagram of a serial link. The link comprises a transmitter 1, a receiver 4 and a transmission line 3 connected between the transmitter 1 and the receiver 4.

When the serial link works as synchronous serial link, the clock clkTX on the transmission side and the clock clkRX on the receiver side are synchronized, this means clkTX=clkRX. However, when the serial link works as asynchronous serial link, both clocks clkTX and clkRX are not synchronized, this means clkTX≠clkRX. Independent from the mode—synchronous or asynchronous—in which the serial link is operated, the method according to the invention can be used to determine the jitter even when user data are transmitted.

The transmission line or transmission channel 3 used in such a serial link application might be typically a single wire, a differential wire pair or an optical channel including laser driver and photo receiver. All of these channels show frequency dependent loss. If a bit stream is transmitted over a channel with frequency dependent loss, then the signal waveform at the receiver 4 shows inter-symbol interference that can significantly close the eye opening EO. Tight time margins with increased bit error rates are a result of that.

The data bit0 to bitn are the real user data which have to be transmitted in normal operating mode from the transmitter 1 via the transmission line 3 to the receiver 4. However since this data bit0 to bitn are available in parallel, the transmitter 1 comprises a serializer 1.2 which receives the parallel data bit0 to bitn at its parallel inputs and processes these data to a serial data stream SD which can be picked off at its serial output. A phase locked loop (PLL) 1.5 determines the frequency of the serializer 1.2, with which the data bit0 to bitn are serialized, wherein the PLL in turn is clocked by an external transmit reference clock clkTX. The transmit reference clock clkTX is generated by an external reference oscillator 1.7.

The transmitter 1 may further comprise an internal build in self test unit BIST 1.6 which is able to generate a pseudo random bit sequence PRBS. This bit sequence can be used for further tests. In particular, a so called PRBS7 bit pattern sequence can be generated and applied during the initialization phase. The PRBS7 bit pattern sequence comprises a defined sequence of 127 bits with around the same number of "0" digits as the number of "1" digits, and which is transmitted repeatedly. The PRBS7 sequence is generated by means of a feedback shift register, wherein this register is not shown in FIG. 1. In general, every pseudo random bit sequence PRBS can be transmitted, as long as this sequence is known at the receiver 4.

With the help of a switching unit 1.3, e.g. an OR gate, either the serialized data SD or the pseudo random bit sequence PRBS is directed to a pre-emphasis unit 1.4 which is also a part of the transmitter 1. The pre-emphasis unit 1.4 should have a frequency dependent gain curve representing the inverse of the loss of the transmission channel 3 for canceling the adverse effects in the transmission channel 3. The expression pre-emphasis unit is used as another term for pre-equalizer unit in the following. If a signal passes through both the pre-emphasis unit 1.4 and the transmission channel 3, the resulting signal shows no frequency dependent loss anymore, and the unwanted inter-symbol interference is reduced to zero in the ideal case. For this purpose, pre-emphasis unit 1.4 comprises a driver and a finite impulse response filter (FIR). The output of the pre-emphasis unit 1.4 forms the output of the integrated transmission chip 1 and is connected to the input of the transmission line 3.

The receiver 4 comprises a digital clock and data recovery (CDR) unit 4.1 whose serial input is connected to the output of the transmission line 3. A PLL 4.3 determines the operating frequency of the digital CDR unit 4.1, wherein the PLL 4.3 in turn is clocked by an external receiver reference clock clkRX. The receiver reference clock clkRX is generated by an external reference oscillator 4.5.

If the data, which have been recovered from the received signal by means of the digital clock and data recovery receiver 4.1, are user data, they are directed to a deserializer 4.2. The deserializer 4.2 generates from the received serial data parallel data Rxbit0 to Rxbitn. The received data can also be directed to a build in self test unit 4.4 including a PRBS checker.

With the help of the invention, the jitter of the transmitted signal can be characterized at runtime by a figure of merit FM that is derived from sample statistics of the clock data recovery receiver 4.1. The relationship between the figure of merit FM and the jitter at a specific bit error rate is established by a pre-calibrated lookup table or a jitter-versus-FM curve.

For the calibration, the jitter-versus-FM curve is characterized in the lab prior to the 'field application' of the SERDES application specific integrated circuit (ASIC) core or SERDES test chip. The term 'field application' means that this is the normal operating mode of the SERDES chip. The calibration procedure can be done as follows:

(a) The sample statistic of the CDR receiver 4.1 is recorded and a figure of merit FM is derived thereof. The definition and way to determine the figure of merit FM will be given below.

(b) The jitter numbers RJ, DJ, TJ associated to the obtained figure of merit FM are determined by dedicated measurement equipment, e.g. jitter bathtub curve measurements or eye diagram statistics.

(c) The steps (a) and (b) are repeated until a completely characterized jitter-versus-FM curve is obtained.

After the calibration procedure of the SERDES chip has been finished the so obtained jitter-versus-FM curve can be used in the normal operating mode of the chip as follows.

A periodically updated sample statistic of the serial user data SD which have been transmitted over the transmission line 3 is recorded and the corresponding figure of merit FM is calculated. The horizontal eye opening at BER=$10^{-12}$ is determined by the jitter-versus-FM curve obtained at step (c). A BER=$10^{-12}$ is a commonly used measure of the link performance but the determination of the jitter is not restricted thereon. The horizontal eye opening can also be determined at e.g. a BER=$10^{-10}$ or $10^{-14}$.

To assure that the described method works even at asynchronous operation, it is assumed that the CDR receiver 4.1 of the SERDES shows a clock offset tracking capability. Doing this, the early and late overhang in the digital clock-data-recovery loop is exploited for an automatic adaptation to clock offsets. Another implementation might be to use the control information of the CDR loop to push the Rx PLL 4.3 such that it tracks clock offsets. In both implementations it is assumed that the jitter-versus-FM curve obtained at step (c) is valid as long as the clock offset is within the capture range or within the bandwidth of equivalent clock offset adaptation 'facility'. The phase offset tracking capability assures that the edge distribution characteristic at asynchronous operation is similar to that at synchronous operation. Therefore, the jitter characterization principle (FM-TJ-curve) outlined above can be applied as well for asynchronous operation. The compensation of the frequency offset is important because otherwise the sampling times of the CDR receiver would always lag or lead the actual data clock and the sample statistics would become 'blurred' after a while owing to the frequency difference between Tx and Rx clock.

Figure 3:
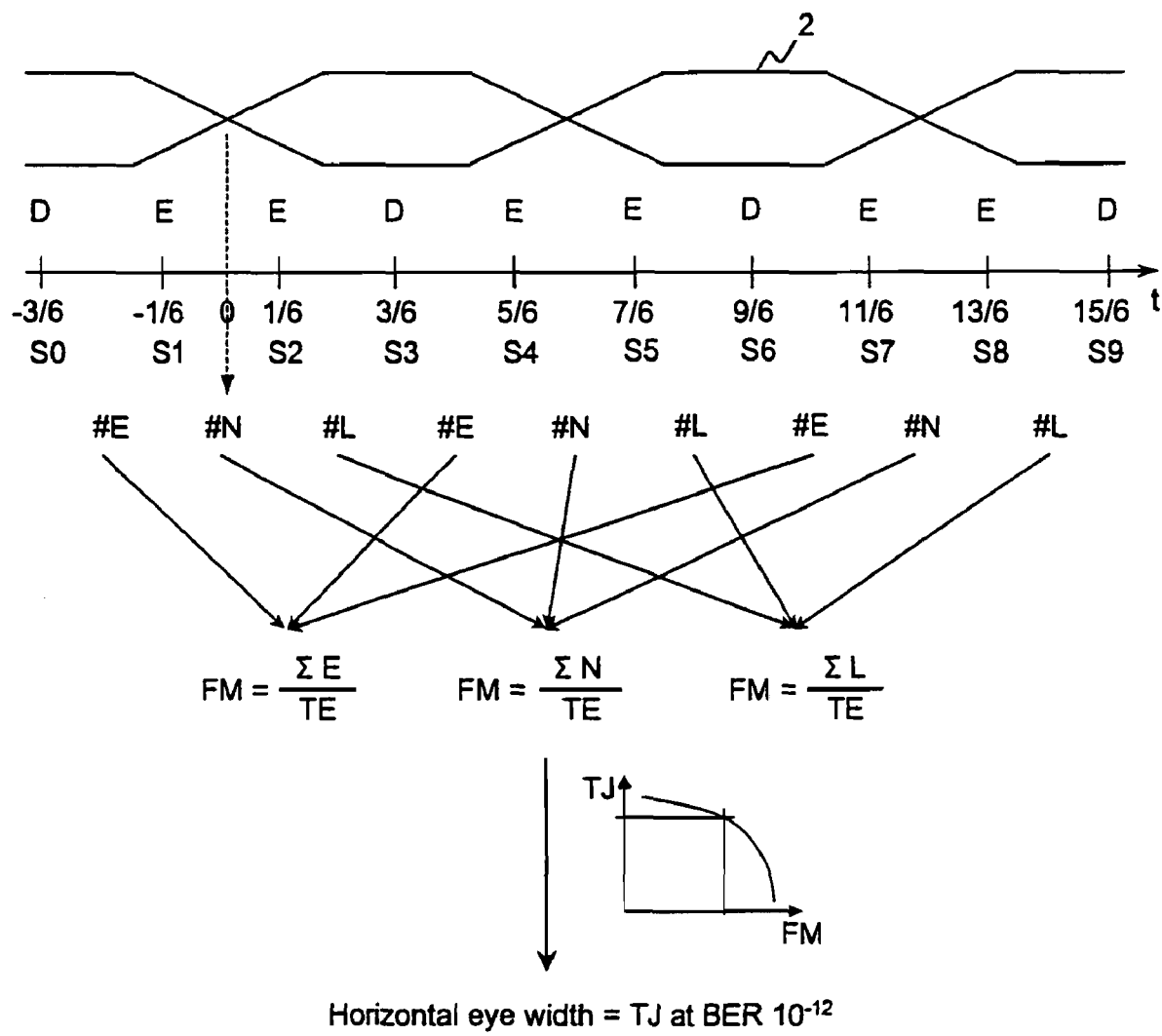

The method for determining the figure of merit FM for a 3-fold oversampled digital CDR receiver is illustrated in FIG. 3. The method according to the invention however is not restricted to a 3-fold oversampling. The sampling may also be for example a 2, 4 or 5-fold oversampling. In an HSS/Unilink test chip of International Business Machines for example during 10 ns ten consecutive samples S0-S9 are taken by the control panel software running on a PC. It is noted that the use of an additional computer, controller, etc. for the recording and evaluation of the samples is not a restriction as such control devices are used anyway in the present field of SERDES applications. It is also noted that the speed of reading e.g. via the PC parallel port interface is much slower than the update rate of the sample register in the SERDES chip. After e.g. 10,000 readings all early edges, nominal edges and late edges are summed up and averaged. Experimental results showed that a one-to-one mapping between averaged nominal edge statistic and total jitter TJ at a bit error rate of $10^{-12}$ exists (refer also to the mathematical derivation of the mapping in the section comprising Eq. (9)). In the current implementation the figure of merit FM is thus mapped to the total jitter number TJ at a bit error rate of $10^{-12}$. A mathematical interpretation of the TJ-FM mapping can be given when evaluating the jitter bathtub curve model at the early, nominal and late edge positions.

Below the timing diagram of the data signal 2 the sampling points and the captured signal states D and E respectively are shown, wherein D corresponds to a data value and E to an edge. After the sample values S0 to S9 have been recorded all pairs of neighboring sample values, i.e. S0 and S1, S1 and S2 etc. are analyzed and from that a statistical value $\Sigma N$, $\Sigma E$, and/or $\Sigma L$ is formed. For example the comparison of the neighboring sample values S0 and S1 results in an increasing value $\Sigma E$, which is also called number of early edges, whereas the comparison of the next neighboring sample values S1 and S2 results in an increasing value $\Sigma N$, which is also called number of nominal edges. The comparison of the third pair of neighboring sample values S2 and S3 results in an increasing value $\Sigma L$, which is also called number of late edges. With the help of the statistic value $\Sigma E$ the early occurring edges #E in the sampled section of the serial data signal 2 are counted. With the help of the statistic value $\Sigma N$ the nominal occurring edges #N and with $\Sigma L$ the late occurring edges #L in the sampled section of the serial data signal 2 are counted.

For the method according to the invention it is not necessary to determine all statistic values $\Sigma E$, $\Sigma N$ and $\Sigma L$. It suffices, if one of these values $\Sigma E$, $\Sigma N$ and $\Sigma L$ is determined. At the same time, the total number of edges TE occurring in the sampled section of the signal 2 are counted. Now the figure of merit FM can be calculated as ratio between one statistic value, e.g. $\Sigma N$, and the total number of edges TE:

$$FM = \frac{\sum N}{TE}$$

Alternatively, the figure of merit FM can also be calculated from:

$$FM = \frac{\sum E}{TE}$$

Furthermore, the figure of merit FM can also be calculated from:

$$FM = \frac{\sum L}{TE}$$

Finally, the figure of merit FM can also be calculated from:

$$FM = \frac{\sum E + \sum L}{TE}$$

Preferably, the figure of merit FM is calculated by means of the statistic value $\Sigma N$.

Figure 4:
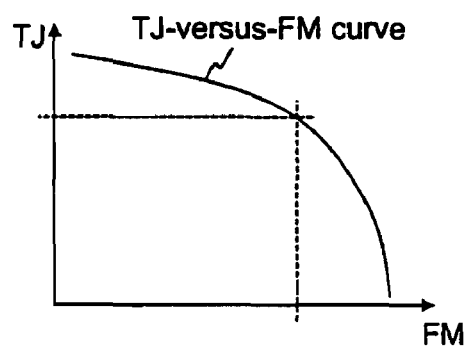

In a further step the horizontal eye width which is an equivalent to the total jitter number TJ is determined with the help of the above mentioned look-up table or TJ-versus-FM curve. An example of such a TJ-versus-FM curve is illustrated in FIG. 4. In this example, the figure of merit FM is plotted on the x-axes and the total jitter number TJ on the y-axis. For each figure of merit FM a corresponding total jitter number TJ can be found on this curve.

The following section reflects a mathematical approach to the invention. It is of interest how jitter affects the bit error rate performance of the serial link. This approach is based on scanning the bit error rate within a data eye. The measured bit error rates result in a curve. This curve is fitted into a mathematical jitter model to obtain the jitter properties.

As already mentioned above, jitter can be split into random and deterministic components. Random jitter is characterized by a Gaussian distribution and stems, for instance, from voltage controlled oscillator (VCO) phase noise or power-supply noise. The probability density function of random jitter $PDF_{RJ}$ is given by:

$$PDF_{RJ} = \frac{1}{\sqrt{2\pi} \cdot RJ} \exp\left(-\frac{t^2}{2 \cdot RJ}\right) \tag{1}$$

The standard deviation $\sigma_{RJ}$ is also referred to as random jitter number RJ, and describes the jitter contribution of all random processes in the serial link. Note that random jitter is of Gaussian nature and is not bounded in amplitude. Thus, the random jitter number RJ is given as root-mean-square value $RJ_{rms}$.

The deterministic jitter DJ is further subdivided into different categories according to its origin. Predominant kinds of deterministic jitter are sinusoidal and data-dependent jitter as well as jitter arising from duty-cycle distortion. Sinusoidal jitter can stem from slow variations of the supply voltage, the temperature, or the clock reference. It is modeled by a sinusoidal single frequency jitter component, with the jitter number SJ being the jitter amplitude at the given frequency. Deterministic jitter due to intersymbol-interference or duty-cycle distortion is also bounded in amplitude by a peak-to-peak value but shows different density functions. As the true density function is generally not known, the probability density function $PDF_{DJ}$ for these kinds of deterministic jitter is approximated by a dual Dirac function, where the density function is assumed to be comprised only of a pair of delta functions:

$$PDF_{DJ} = \frac{1}{2}\delta\left(t - \frac{DJ}{2}\right) + \frac{1}{2}\delta\left(t + \frac{DJ}{2}\right) \tag{2}$$

Each delta function is offset from the mean crossing position by half the peak value of the jitter number DJ. The kinds of deterministic jitter described differ not only by their PDFs but also by their frequency spectral characteristics. Whereas sinusoidal jitter typically represents low-frequency jitter, all other deterministic jitter is high-frequency. Low-frequency jitter is not that much of a problem in high-speed serial links as the clock-data-recovery receiver is capable of tracking jitter with frequency contents lying within its loop bandwidth. The low-frequency jitter tracking capability of the clock-data-recovery receiver requires that the overlaying protocol function must have sufficient storage capacity to handle the additional delay. As only high-frequency deterministic jitter is detrimental to the link's bit error rate BER performance, sinusoidal jitter will therefore not be considered in the jitter model discussed below.

Figure 5:
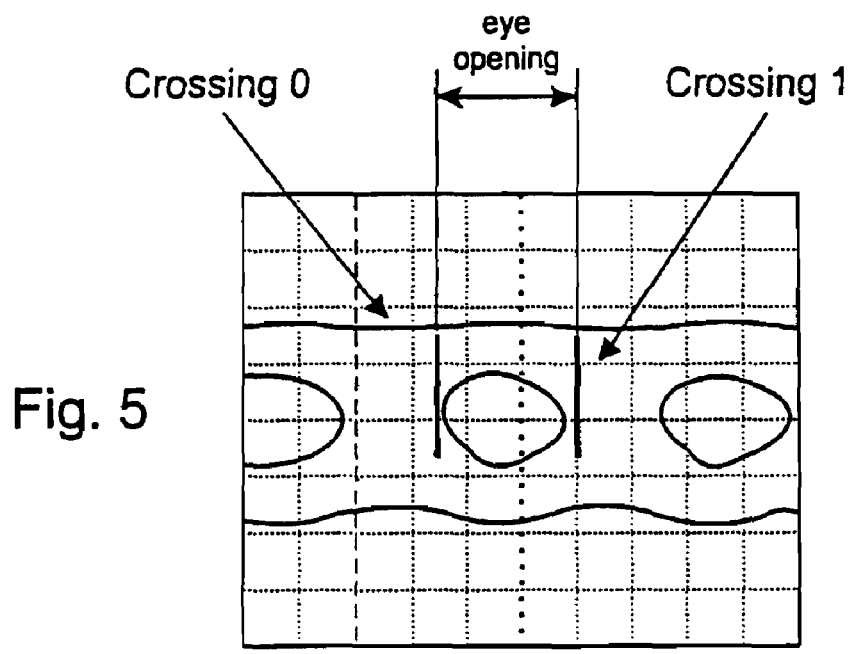

When adding contributions from different random variables, their density functions will be convoluted. The total probability density function $PDF_{crossing0}$ related to the first zero crossing of the eye according to FIG. 5 is thus given by the convolution of the probability density function of random jitter $PDF_{RJ}$ and the probability density function of deterministic jitter $PDF_{DJ}$:

$$PDF_{crossing0} = \frac{1}{\sqrt{2\pi} RJ} \exp\left(-\frac{t^2}{2RJ}\right) \otimes \tag{3}$$
$$\left\{\frac{1}{2}\delta\left(t - \frac{DJ}{2}\right) + \frac{1}{2}\delta\left(t + \frac{DJ}{2}\right)\right\}$$
$$= \frac{1}{2\sqrt{2\pi} RJ}\left(\exp\left(-\frac{(t - DJ/2)^2}{2RJ}\right) + \exp\left(-\frac{(t + DJ/2)^2}{2RJ}\right)\right)$$

The same relationship holds for the second zero crossing—but maybe with other values for DJ and RJ. The fact that there could be different values for the jitter numbers of the left- and right-hand-side zero crossings is not allowed for in the following computations but can easily be implemented by introducing a kind of effective jitter number that equals the mean value of the jitter numbers for both zero crossings.

To calculate the probability of error due to jitter, the area under the PDF tail on the error side of the sampling point must be calculated. This yields the cumulative distribution function CDF. For instance, for the left-hand-side zero crossing0, the integration is carried out from the sampling point to +∞:

$$CDF_{crossing0} = \int_t^\infty PDF_{crossing0} dt \tag{4}$$
$$= \frac{1}{4}\left(2 + \text{erf}\left(\frac{t - DJ/2}{\sqrt{2} RJ}\right) + \text{erf}\left(\frac{t + DJ/2}{\sqrt{2} RJ}\right)\right)$$

where erf( ) denotes the error function.

To determine the bit error rate BER, the probability of transition error, which is identical to the CDF function, must be multiplied by the transition probabilities $p_{trans}$ (e.g. $p_{trans}$=0.496 for PRBS7, $p_{trans}$=number of ones/($2^7$ bits−1) =63/127). The contributions to the bit error rate from both zero crossings are then added:

$$BER = P_{biterror} = p_{trans}CDF_{crossing0} + (1 - p_{trans})CDF_{crossing1} \tag{5}$$

Equation (5) describes the jitter model used for the bit error rate test scan technique mathematically. In a bit error rate scan, the bit error rate is measured as the sampling point is swept between the two zero crossings. The resulting bit error rate curve is a bathtub curve, and corresponds to the formula given by equation (5). The measured bathtub curve and the bathtub curve obtained from the jitter model can now be fitted to obtain the desired jitter numbers. The curve-fitting procedure is quite simple as deterministic jitter DJ only shifts the bathtub curve in horizontal direction and random jitter RJ only affects the steepness of the bathtub curve edges. With regard to the eye diagram presented in FIG. 5, the random jitter number RJ determines the 'thickness' of the bell curves and the deterministic jitter number DJ determines the overlapping distance between the bell curves at each eye crossing.

The accuracy of the bathtub curve fit decreases towards very high and very low bit error rate values. For the former, significant deviations from the assumed curve fit shape can be observed owing to a wrong signal conditioning due to, for instance, overshoot or undershoot effects. For the latter, the accuracy might deteriorate if too short a measurement time is chosen for the bit error rate value targeted.

The bathtub curve fit yields jitter numbers that characterize the properties of jitter appropriately. These jitter numbers also allow the determination of the horizontal eye opening for a specific bit error rate boundary. This is done by calculating the total jitter, which will be discussed in more detail in the following.

Random and deterministic jitter accumulate differently in a serial link. Whereas deterministic jitter is always specified by a peak-to-peak value, random jitter is given by an rms value $RJ_{rms}$, which must first be translated into a peak-to-peak value $RJ_{p-p}$ prior to adding random and deterministic jitter values. The translation from $RJ_{rms}$ to $RJ_{p-p}$ is dependent on the BER boundary considered and can be written as:

$$RJ_{p-p} = k_\sigma RJ_{rms} \quad (6)$$

where $k_\sigma$ denotes a factor associated to different bit error rate boundaries given in Table 1.

TABLE 1

Multiplication factors for the translation from $RJ_{rms}$ to $RJ_{p-p}$

| BER | kσ |
|---|---|
| 1e−4 | 7.08 |
| 1e−5 | 8.22 |
| 1e−6 | 9.22 |
| 1e−7 | 10.14 |
| 1e−8 | 10.98 |
| 1e−9 | 11.77 |
| 1e−10 | 12.51 |
| 1e−11 | 13.21 |
| 1e−12 | 13.88 |
| 1e−13 | 14.51 |
| 1e−14 | 15.13 |
| 1e−15 | 15.71 |
| 1e−16 | 16.29 |
| 1e−17 | 16.75 |

The table entries were computed numerically by solving equation (5) for RJs with different BER values and DJ=0. Table 1 also allows $RJ_{p-p}$ to be specified for the bit error rate BER extrapolated to very low values (e.g. $<10^{-14}$) that could not be measured owing to measurement time restrictions. Once $RJ_{p-p}$ has been calculated for a specific bit error rate value, the total jitter TJ associated with this BER is easily determined by $$TJ = DJ + RJ_{p-p} = DJ + k_\sigma RJ_{rms} \quad (7)$$

The total jitter TJ can be expressed in absolute time units, such as ps, or relative to the nominal bit period in units of the unit interval UI. One unit interval UI corresponds to one nominal bit length. If the total jitter number TJ is given in UI, the horizontal eye opening in percent can be stated as $$\text{Horizontal Eye Opening [\%]} = (1-TJ)\% * 100\% \quad (8)$$

Figure 6:
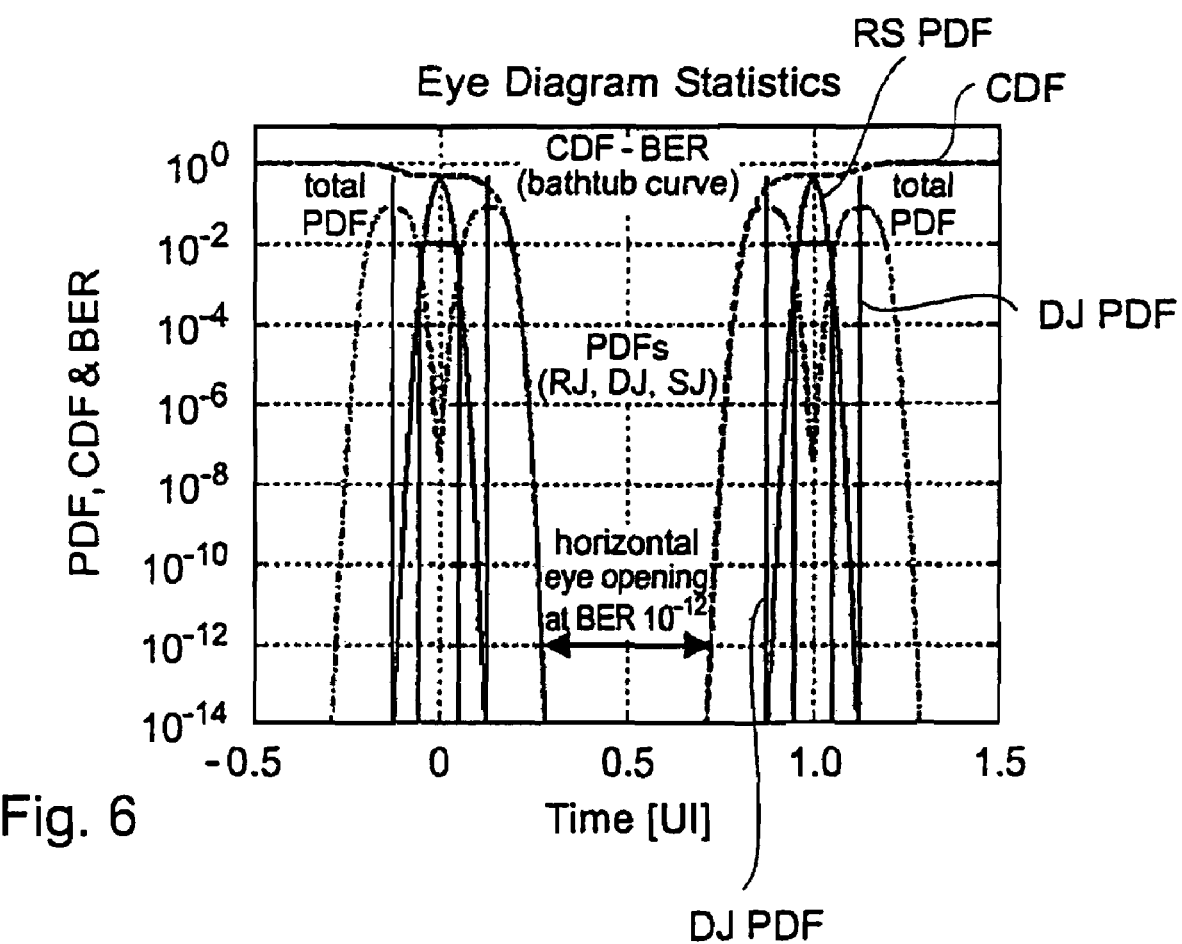

FIG. 6 illustrates the jitter model: The solid curves represent the individual PDFs of the random, deterministic, and sinusoidal jitter components. The total PDF (dash-dotted curve) equals the convolution of the RJ, DJ and SJ PDF. The cumulative distribution function (dashed curve) of the total PDF will be fitted to the measured bathtub curve. Note that, prior to performing the bathtub curve fit, the CDF must be multiplied by the transition probabilities. The jitter numbers associated with the PDFs displayed are RJ=0.015 UI, DJ=0.2 UI and SJ=0.1 UI. For the sake of completeness, all jitter components are used in this embodiment, although SJ can be disregarded for measurements of serial links that are able to track low-frequency jitter.

Figure 7:
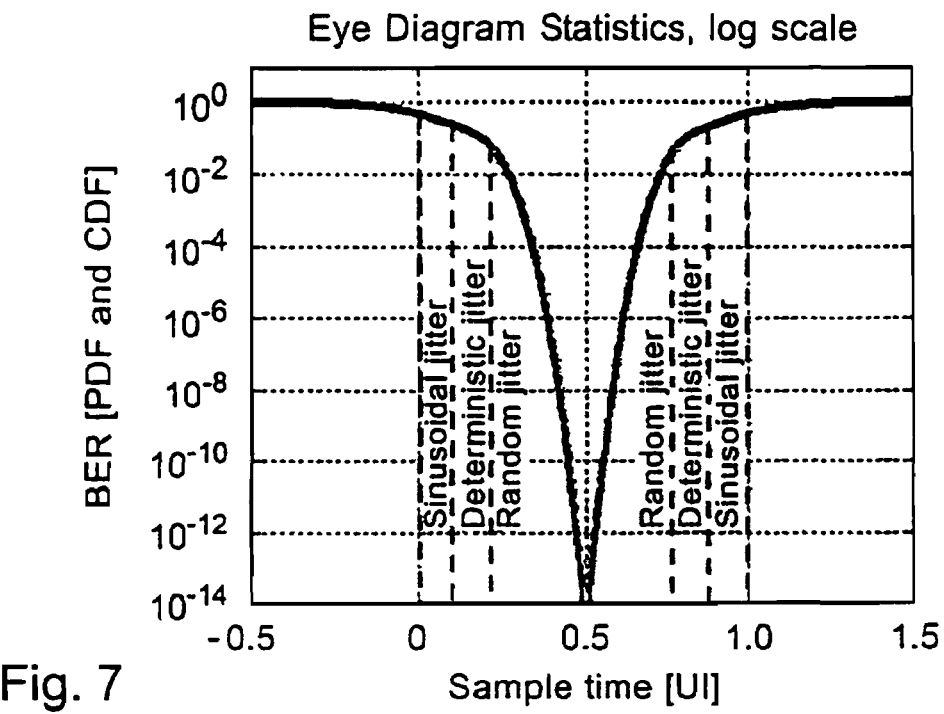

FIG. 7 shows a bathtub curve that is subdivided into regions where the jitter components specified predominantly affect the curve shape.

The idea of this proposed equalization embodiment as described in the International Business Machines patent application EP 03405341.3 "Adjusting parameters of a serial link" is to record the fitted RJ and DJ numbers for each setting of the FIR tap weight which determines the level of pre-emphasis for the equalization, and to find the RJ/DJ pair with the largest eye opening which in turn determines the best FIR tap setting. The largest eye opening occurs where the sum of RJ and DJ is lowest. Note that for data transmission over high-speed serial links the horizontal eye opening is more important than the vertical eye opening as the signal power is not an issue.

The jitter characterization method described here can also easily be extended to perform an optimization of the FIR coefficients in the Tx pre-emphasis filter. For this purpose the FIR tap weights are swept across a certain range and for each FIR setting the corresponding FM-TJ pair is recorded. After the sweep of the FIR tap weight has finished the recorded FM-TJ pairs are analyzed to find the FIR tap weight that produced the lowest TJ value. Owing to the fact that inter-symbol interference (ISI) appearing as additional DJ in the signal is contained in the TJ value according to Eq. (7) the optimum FIR tap weight finding method described adjusts the tap weight in a way such that the channel gets optimally equalized.

The following section outlines the analytical derivation of the jitter-versus-figure of merit curve that is used at the operation of the link with user data to monitor how much jitter the channel shows.

It is assumed that the figure of merit FM is defined as FM=ΣN/TE. In the case of 3-fold oversampling a nominal edge #N as defined above is detected if the actual data edge occurs within $t=-\frac{1}{6}$ UI to $t=+\frac{1}{6}$ UI or $t=-\frac{5}{6}$ UI to $t=-\frac{7}{6}$ UI. Thus, the distribution of the nominal edges #N can be expressed by $$\int_{t=0\,UI}^{t=1/6\,UI} PDF(RJ, DJ, t)dt + \int_{t=5/6\,UI}^{t=1\,UI} PDF(RJ, DJ, t)dt = \quad (9)$$

$$2\int_{t=0\,UI}^{t=1/6\,UI} PDF(RJ, DJ, t)dt =$$

$$2 \cdot (CDF(RJ, DJ, t=0) - CDF(RJ, DJ, t=1/6\,UI))$$

In contrast to Eq. (5), it is assumed in Eq. (9) that the two eye crossings show identical CDF functions for the purpose of simplicity. Eq. (9) can then be multiplied by $p_{trans}$. This yields an equation for the statistical value FM=ΣN/TE $$FM = 2 \cdot p_{trans} \cdot (CDF(RJ, DJ, t=0\,UI) - CDF(RJ, DJ, t=\frac{1}{6}\,UI)) \quad (10)$$

Figure 8:
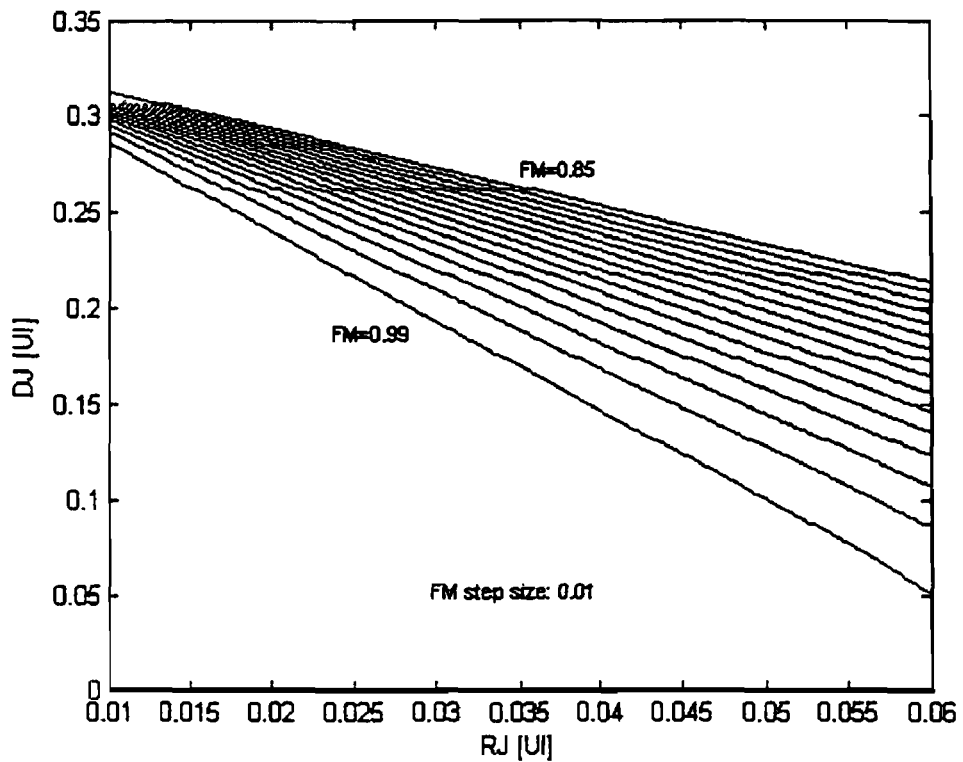
Figure 9:
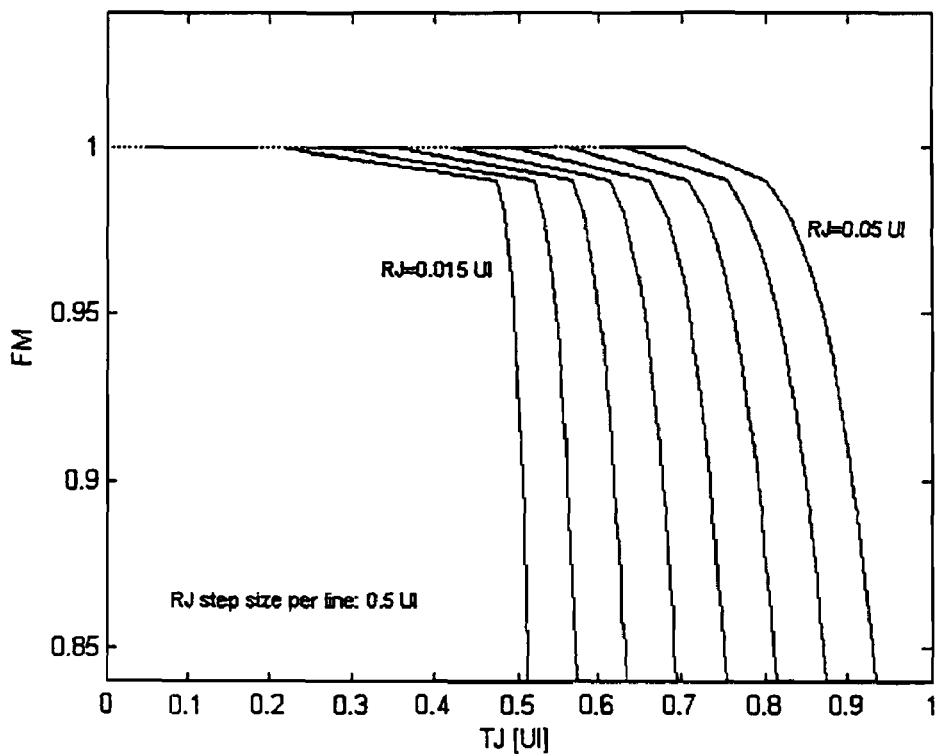

The solutions of Eq. (10) are shown in FIG. 8. They represent a set of straight lines in the RJ-DJ-plane parameterized by different FM values. The ripples in the curve arise from the solution finding algorithm. Furthermore it is assumed that a certain family of SERDES cores shows a relatively constant RJ value that is mainly dominated by the phase noise performance of the PLL and the supply noise rejection. Ideally, the spread of the RJ value is assumed to be very small within the family of SERDES cores. If these assumptions are true the desired jitter-versus-FM curve can be extracted from FIG. 8 by calculating the total jitter TJ based on Eq. (7) for only single fixed RJ value. This procedure equals a vertical cut through FIG. 8. The resulting jitter-versus-FM curve is shown in FIG. 9. For the purpose of illustrations, the calculations were carried out for different RJ values. The curves in FIG. 9 are therefore parameterized by different values of RJ.

For the sake of completeness, note that the above analysis can also be performed with the complementary sample statistics that is defined as $$FM' = \frac{\sum E}{TE} + \frac{\sum L}{TE} \quad (11)$$
$$= 2 \cdot p_{trans} \cdot (CDF(RJ, DJ, t = 1/6 \text{ UI}) - CDF(RJ, DJ, t = 1/2 \text{ UI}))$$

with FM'=1−FM.

The evaluation of Eq. (11) yields results that are identical to that shown in FIG. 8 and FIG. 9.

In the following, a method and apparatus for generating random jitter is described. For all these characterization and measurement tasks accurately adjustable and measurable jitter sources are required. Owing to the characteristic of a typical clock-data recovery circuit that tracks low frequency jitter, typically sinusoidal jitter SJ, or wander, but gets affected by high-frequency jitter components, mainly high-frequency RJ and DJ jitter sources are of particular interest. Ideally, these jitter sources should be operable independently of each other meaning that a random jitter source should only generate random jitter without affecting the DJ jitter contribution or deteriorating the amplitude of the data signal. Vice versa a DJ jitter source should not generate additional random jitter. This is important because the effect of deterministic jitter can be mitigated by the application of pre-emphasis or equalization and it might be interesting to know for the application of the serial link to what extent the impact of deterministic jitter can be eliminated. In terms of measurement complexity and effort, the generation of a controllable amount of deterministic jitter can easily be done by varying the length of the transmission channel or by introducing additional reflections. Both methods result in a variation of the amount of intersymbol interference, which is the major source of DJ. As mentioned above attention has to be paid to not reduce the signal amplitude too much by the signal attenuation of the transmission channel as only timing jitter and not amplitude jitter is relevant for the characterization of serial links.

As outlined in the previous section, the availability of a simple and low-cost solution for an accurately adjustable random jitter generator is of particular interest when having to characterize serial links regarding their standard compliance. The jitter generation method described here is a simple yet accurate jitter generation method that shows the advantage that it can easily be integrated into the evaluation board of the SERDES test chips that are shipped to the customers of the HSS ASIC cores.

Figure 10:
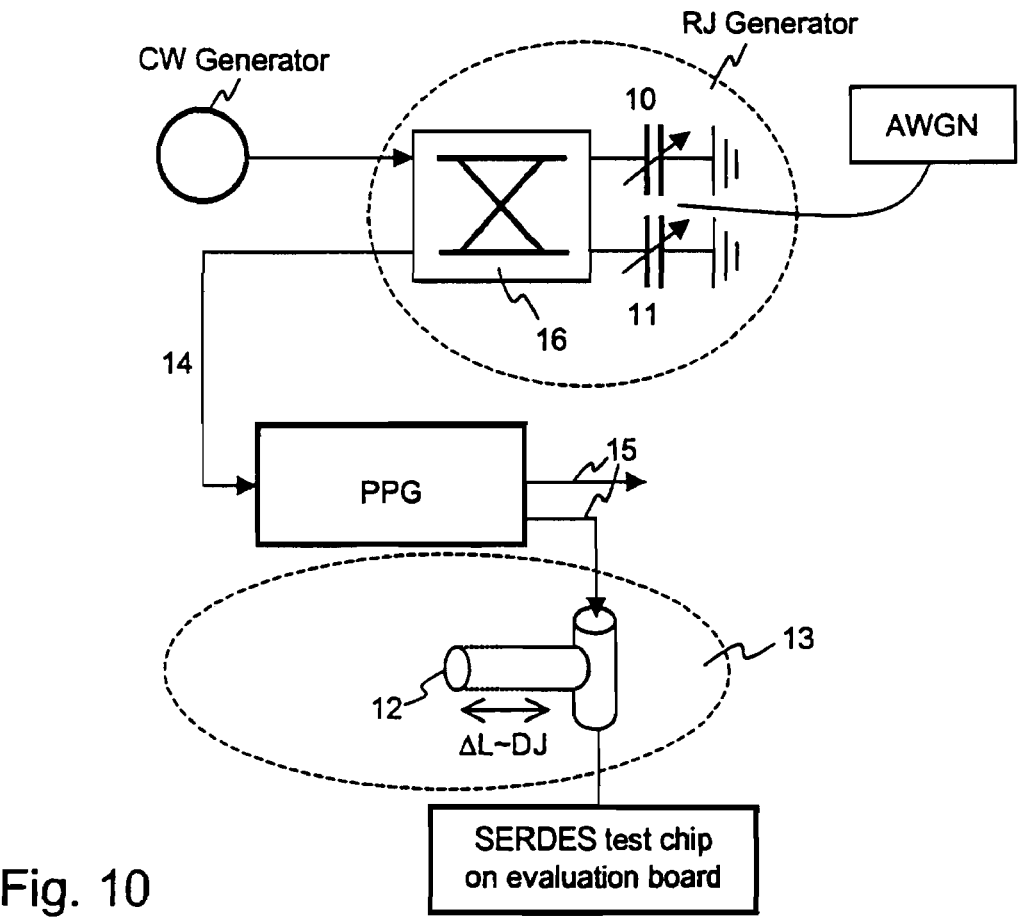

A schematic of a jitter generator is shown in FIG. 10. It consists among other things of a reflection-type phase shifter 16 that is optimized for a maximally flat amplitude characteristic and 0° to 360° phase adjustment range. An arbitrary waveform generator AWGN modulates the phase shifter 16 by a Gaussian noise signal. The output signal 14 of the phase shifter 16 is then fed to the reference clock input of a pulse pattern generator PPG. Owing to the random jittered reference signal 14, the data patterns 15, e.g. PRBS7 through PRBS31, at the output of the pulse pattern generator PPG show a jitter content that ideally corresponds to the desired random jitter number. As will be shown below, the random jitter number equals a noise amplitude level entered at the arbitrary waveform generator AWGN. Deterministic jitter—for instance used for jitter tolerance tests—can be added separately by means of a deterministic jitter generator 13. A small section of an open-circuited stub line 12 that creates reflections showing the same effect as deterministic jitter generated by ISI. The desired deterministic jitter number can be adjusted by varying the length of the stub line 12.

An advantage of this jitter generator is that the desired jitter can be simple generated and that the generator is cheap. The generator needs an expensive pulse pattern generator PPG but the pulse pattern generator is needed anyway when having to perform standard compliance measurements where bit error rate tests are required. A further advantage is that with the help of the described generator random jitter and deterministic jitter numbers can be adjusted individually and independently. Furthermore, the described generator meets all of the above stated requirements and can easily be adapted to higher data rates and moreover is not limited to fixed data rates. The generator also shows a higher deviation frequency than PLL-based solutions. Advantageously, the generator is easy to integrate onto a customer test chip evaluation board. Therefore, the customer needs to care less about appropriate jitter generation equipment. Finally owing to its low-cost, the jitter generator can easily be duplicated and used for measuring multiple links in parallel, provided that multiple pulse pattern generators are available, too—e.g. from a parallel bit error rate tester (ParBERT) system. In a ParBERT several BERTs are arranged in parallel.

Figure 11:
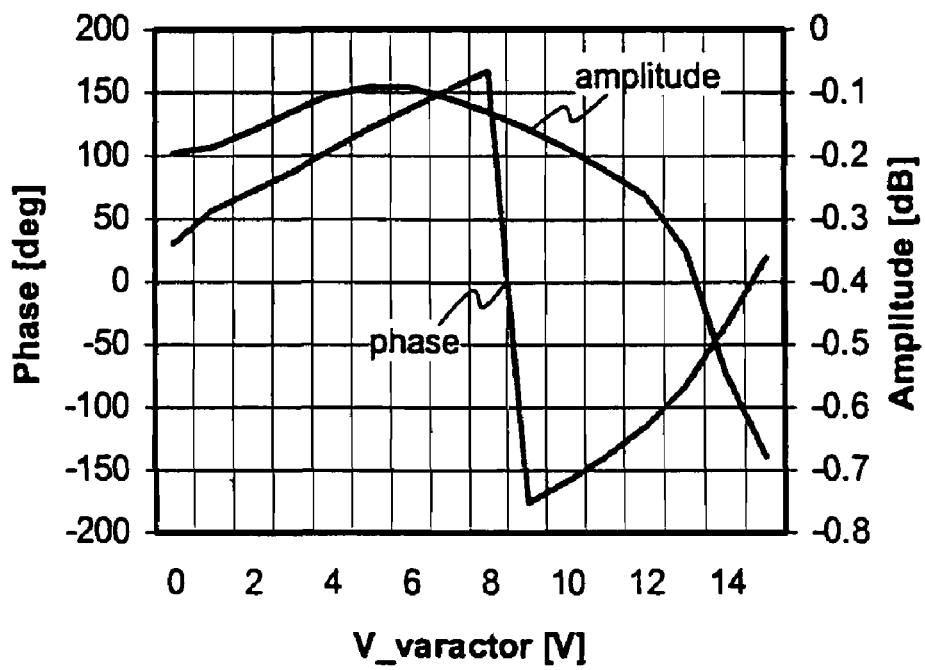

This section focuses on the design of the random jitter generator and the presentation of the measurement results. The reflection-type phase shifter 16 is coupled with one of its inputs to a CW generator and is composed of a 3 dB/90° hybrid built on FR-4, wherein FR-4 expresses the material of frequently used printed-circuit-boards (PCB). Its other inputs are connected to two identical loads 10 and 11 consisting of two varactor diodes each. The varactor diodes are separated by λ/4 lines to extend the phase adjustment range. The input and output of the phase shifter 16 are AC-coupled and the Gaussian noise signal is fed to the varactor diodes by a bias-T (a serial inductivity L in combination with DC blocks at the input and output). The achieved phase adjustment range and amplitude deviation is shown in FIG. 11.

The reflection-type phase shifter 16 is designed on FR-4 using Infineon BB883 varactor diodes. As already mentioned above, the integration of the random jitter generator onto the test board can easily be done and may represent a valuable additional test board feature.

Figure 12:
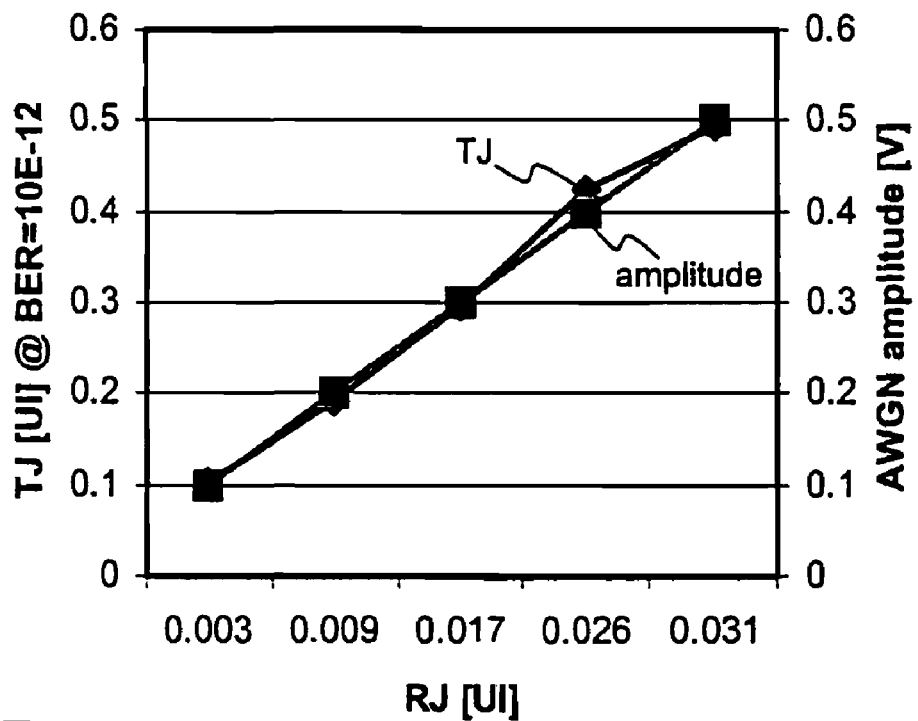

The actual "performance" of the jitter generator for generating random jitter and independent thereof deterministic jitter is shown in FIG. 12 that represents a graphical summary of the measurement results listed in Table 2:

TABLE 2

Measured random jitter performance of the phase shifter at a data rate of 2.5 Gbps

| AWGN [V] | DJ [UI] | RJ [UI] | TJ [UI] | Eye width [ps] | #hits |
|---|---|---|---|---|---|
| 0.1 | 0.06 | 0.003 | 0.102 | 373 | 49.3k |
| 0.2 | 0.06 | 0.009 | 0.193 | 345 | 36.4k |
| 0.3 | 0.06 | 0.017 | 0.298 | 306 | 63.9k |
| 0.4 | 0.06 | 0.026 | 0.424 | 225 | 49.7k |
| 0.5 | 0.06 | 0.031 | 0.494 | 189 | 73.7k |
| 0.6 | — | — | — | 157 | 63.7k |
| 0.7 | — | — | — | — | 92.3k |

The measurements were done by applying a reverse voltage of 2.5 V to the varactor diodes and varying the amplitude of the arbitrary waveform generator AWGN producing Gaussian noise in steps of 100 mV from 0 V to 500 mV. Despite the relatively low modulation amplitude the data eye closes pretty well only due to timing jitter. Verifications made by bathtub curve measurements showed that the increase of timing jitter is solely caused by random jitter whereas the extracted DJ value remains constant. Moreover, as shown in FIG. 12, the total jitter TJ at a bit error rate BER of $10^{-12}$ and hence also the eye width are a linear function of the noise amplitude entered at the arbitrary waveform generator AWGN. This allows easily extrapolating the adjusted random jitter values to the limits where the eye is that much closed by random jitter that the PRBS checker in the error detector of the BERT system loses synchronization and the bathtub curve measurements cannot be done anymore.

Having illustrated and described a preferred embodiment for a novel method and apparatus for, it is noted that variations and modifications in the method and the apparatus can be made without departing from the spirit of the invention or the scope of the appended claims.

The invention claimed is:

1. An apparatus, comprising:
   a phase shifter;
   an adjustable capacitance coupled to and configured to adjust a phase shift of said phase shifter;
   an arbitrary waveform generator coupled to and configured to adjust said adjustable capacitance; and
   a pulse pattern generator coupled to said phase shifter, wherein said phase shifter is configured to control said pulse pattern generator.

2. The apparatus according to claim 1, wherein said adjustable capacitance is at least one varactor diode.

3. The apparatus of claim 2, wherein the at least one varactor diode is a pair of varactor diodes separated by $\lambda/4$ lines; and
   an input and an output of the adjustable capacitance is AC-coupled; and
   wherein the arbitrary waveform generator is configured to adjust the adjustable capacitance through a gaussian noise signal input to the pair of varactor diodes.

4. The apparatus of claim 3, further comprising a deterministic jitter generator coupled to an output of the pulse pattern generator.

5. The apparatus of claim 4, further comprising an open-circuited stub line input to the pulse pattern generator.

6. A method for generating random jitter, comprising:
   adjusting a capacitance of an adjustable capacitance element in response to an arbitrary waveform generator output;
   adjusting a phase shift of a phase shifter in response to adjusting the capacitance of the adjustable capacitance element;
   the adjusted phase shifter phase shifting a data input signal in response to adjusting the capacitance of the adjustable capacitance element; and
   a pulse pattern generator generating a data signal comprising a jitter content in response to the phase-shifted data input signal.

7. The method of claim 6, wherein adjusting the phase shift of the phase shifter comprises modulating a phase shift of the data signal input in response to an arbitrary waveform generator gaussian noise signal output; further comprising inputting the phase-shifted data input signal to a pulse pattern generator reference clock input.

8. The method of claim 7, the adjustable capacitance element comprising at least one varactor diode.

9. The method of claim 8, the at least one varactor diode comprising a pair of varactor diodes, further comprising:
   separating the pair of varactor diodes by $\lambda/4$ lines;
   AC-coupling an input and an output of the adjustable capacitance element; and
   adjusting the adjustable capacitance through the gaussian noise signal input to the pair of varactor diodes.

10. The method of claim 9, further comprising:
    coupling a deterministic jitter generator to an output of the pulse pattern generator; and
    an open-circuited stub line creating deterministic jitter effect reflection inputs to the pulse pattern generator.

11. The method of claim 10, further comprising adjusting a deterministic jitter number of the jitter content by varying a length of the open-circuited stub line.

12. A method for deploying an application for generating random jitter, comprising:
    providing an electrical device infrastructure being operable to:
    adjust a capacitance of an adjustable capacitance element in response to an arbitrary waveform generator output;
    adjust a phase shift of a phase shifter in response to adjusting the capacitance of the adjustable capacitance element;
    the adjusted phase shifter phase shifting a data input signal in response to adjusting the capacitance of the adjustable capacitance element; and
    a pulse pattern generator generating a data signal comprising a jitter content in response to the phase-shifted data input signal.

13. The method of claim 12, the electrical device infrastructure being further operable to adjust the phase shift of the phase shifter by modulating a phase shift of the data signal input in response to a arbitrary waveform generator gaussian noise signal output; and
    input the phase-shifted data input signal to a pulse pattern generator reference clock input.

14. The method of claim 13, the adjustable capacitance element comprising at least one varactor diode.

15. The method of claim 14, the at least one varactor diode comprising a pair of varactor diodes separated by $\lambda/4$ lines, the electrical device infrastructure being further operable to:
    AC-couple an input and an output of the adjustable capacitance element; and
    adjust the adjustable capacitance through the gaussian noise signal input to the pair of varactor diodes.

16. The method of claim 15, the electrical device infrastructure being further operable to:
    couple a deterministic jitter generator to an output of the pulse pattern generator; and
    create deterministic jitter effect reflection inputs through an open-circuited stub line to the pulse pattern generator.

17. The method of claim 16, the electrical device infrastructure being further operable to adjust a deterministic jitter number of the jitter content in response to varying a length of the open-circuited stub line.

* * * * *